United States Patent [19]

Wheeler, Jr. et al.

[11] 4,280,801
[45] Jul. 28, 1981

[54] CROSSHEAD

[75] Inventors: Norton C. Wheeler, Jr., Mystic; John G. Seuferling, Norwich; Simo A. O. Pennila, Rowayton, all of Conn.

[73] Assignee: Crompton & Knowles Corporation, New York, N.Y.

[21] Appl. No.: 43,923

[22] Filed: May 30, 1979

[51] Int. Cl.³ .......................... B29D 23/04; B29F 3/04
[52] U.S. Cl. ..................................... 425/113; 264/173; 264/174; 264/209.1; 425/133.1; 425/192 R; 425/376 A; 425/462
[58] Field of Search ................ 425/133.1, 113, 192 R, 425/376 A, 131.1, 114, 462; 264/209, 173, 174

[56] References Cited

U.S. PATENT DOCUMENTS

| | | |
|---|---|---|
| 2,239,408 | 4/1941 | Wallace ................................. 425/113 |
| 2,824,337 | 2/1958 | Covington, Jr. et al. ........ 425/376 A |
| 2,859,476 | 11/1958 | Lainson ................................. 425/462 |
| 3,323,172 | 6/1967 | Pierson et al. .................... 425/376 A |
| 3,345,690 | 10/1967 | Hagen .................................. 264/209 |
| 3,357,051 | 12/1967 | Zolotarevsky .................... 425/192 R |
| 3,402,427 | 9/1968 | Christofas ............................. 425/113 |
| 3,404,432 | 10/1968 | White et al. .......................... 425/113 |
| 3,820,927 | 6/1974 | Toomajanian ....................... 425/113 |
| 3,856,448 | 12/1974 | Iijima et al. ......................... 425/133.1 |
| 4,042,661 | 8/1977 | Cook .................................... 264/209 |
| 4,061,461 | 12/1977 | Hessenthaler ..................... 425/133.1 |
| 4,081,232 | 3/1978 | Pemberton et al. ............. 425/192 R |
| 4,097,564 | 6/1978 | Lair ...................................... 264/209 |

Primary Examiner—Jeffery R. Thurlow

[57] ABSTRACT

A crosshead for extruding an annular layer of thermoplastic material about a central longitudinal axis. The crosshead comprises a die having an annular slotted die opening surrounding the axis, a transverse inlet passageway for receiving molten thermoplastic material, an annular cavity connected to the inlet passageway, an annular distribution passage connected to the annular cavity and an annular connecting passage extending from the annular distribution passage to the die opening. The annular cavity and annular distribution passage each extend radially with respect to the longitudinal axis. Two or more layers of thermoplastic material are extruded by the crosshead when it is equipped with two or more dies.

14 Claims, 11 Drawing Figures

CROSSHEAD

BACKGROUND OF THE INVENTION

The present invention relates generally to a crosshead for extruding one or more annular layers of thermoplastic material. The invention is particularly applicable for extruding one or more layers of thermoplastic material about a wire passing through the crosshead. Wire coated by extrusion ranges from a fine single strand to thick composite cable of several inches.

PRIOR ART

A prior art crosshead which is used in the wire insulating industry is shown in the Figure labelled PRIOR ART in the drawings. This Figure is a longitudinal cross-sectional view. The crosshead is identified as a model 450-73 Dual Head manufactured by Davis Standard, a division of Crompton & Knowles Corporation, located in Pawcatuck, Conn.

Referring to the Prior Art figure, the crosshead is generally indicated by the reference numeral 102 and contains two dies generally indicated at 104 and 106 for extending two layers of thermoplastic material about a wire. The crosshead comprises a central bore 108 through which the wire passes. The wire, indicated by the reference numeral 110, passes through the bore 108 in the direction of arrow 109 along its central longitudinal axis 112 from a payoff reel to a take-up reel. The payroll reel and take-up reel are not shown but are well known in the art.

Dies 104 and 106 comprise inlet passageways 114 and 116, respectively. Each inlet passageway is connected to an extruder through an adapter. The extruder and adapter are not shown but are also well known in the art. Dies 104 and 106 also comprise annular slotted die openings 118 and 120, respectively, which open into bore 108.

Die 104 is the upstream die in the crosshead 102 and comprises an annular distribution passage 122 and an annular cavity 124 which connects the passage 122 to inlet passageway 114. An annular connecting passage 126 connects the distribution passage 122 to the die opening 118.

Die 106 is the downstream die in the crosshead 102 and comprises an annular distribution passage 128 and an annular cavity 130 which connects the passage 128 to inlet passageway 116. An annular connecting passage 132 connects the distribution passage 128 to the die opening 120.

The annular cavity and distribution passage of each die extends generally parallel to the axis 112. The connecting passage 126 of the upstream die 104 extends between the axis 112 and the flow path of die 106, including cavity 124, distribution passage 122 and connecting passage 126. Thermoplastic material enters the inlet passageway of each of the dies 104 and 106 and flows through the cavity, distribution passage and connecting passage of each die to the die opening where it is deposited on the wire passing through the bore 108. Thermoplastic material from opening 114 is deposited on the surface of the wire to form the first layer, shown by dot and dash line 134. Thermoplastic material from opening 120 is deposited on layer 134 to form the second layer shown by dot and dash line 136.

The cavity and distribution passage of each die advances forwardly toward the die openings from a point adjacent the inlet passageway to a point on the opposite side of the inlet passageway. The axial length of each cavity and distribution passage also diminishes from the point adjacent the inlet passageway to the point on the opposite side of the inlet passageway. Therefore, the molten thermoplastic flows generally helically about the central longitudinal axis 112 from each side of the inlet passageway for each die. Since the length of the cavity and distribution passage is at a maximum adjacent the inlet passageway and at a minimum at the point farthest from the inlet passageway, the flow of material is uniform as the material passes from the distribution passage to the connecting passage. Although the forwardly extending cavity and distribution passage of each die successfully distributes the molten thermoplastic material evenly to the connecting passage, the resulting long flow path means that the material takes longer to reach the die opening.

Thermoplastic material degrades at its melting temperature so that it is important to minimize the length of time that the material is in a hot fluid state. Some materials degrade by cross-linking, thereby converting the thermoplastic material to a thermoset material. Other thermoplastic materials such as polyvinyl-chloride degrade by breaking down into separate components of the material. All cases of degradation result in inferior products.

A long flow path also results in a pressure drop, particularly if the layer to be extruded through the die opening is thin. Pressure is maintained by making the connecting passage larger in cross-sectional than the die opening. This results in a "stagnant" flow of material and thereby causing further degradation.

A more serious problem exists with crossheads containing two or more dies for extruding two or more layers of thermoplastic material. Because of the low flow path between each inlet passageway and die opening, the die openings are spaced along the axis of the crosshead bore. This results in poor bonding between the layers of thermoplastic material because of partial setting of the first layer. It is important that the layers are applied to the wire as close as possible along the axis of the bore. In order to achieve this condition, the length of the connecting passage of the upstream die must be made exceptionally long as shown in the Figure labeled PRIOR ART. The resulting longer flow path in the upstream die 104 increases the problem of degradation of the thermoplastic material.

It is the principal object of the present invention to provide a crosshead which overcomes all of the disadvantages of the prior art crossheads by providing a die having a shorter flow path.

A further object of the present invention is the provision of a crosshead having two or more dies in which the openings are close together along the central longitudinal axis of the crosshead bore without substantially increasing the length of the flow path of either die.

A still further object of the invention is the provision of a crosshead comprising short sturdy tooling which results in a shorter "heat up time" at the beginning of the extruding operation.

SUMMARY OF THE INVENTION

In general, the invention consists of a crosshead for extruding one or more annular layers of thermoplastic material about a central longitudinal axis. The crosshead has one or more dies, each of which comprises an annular slotted die opening surrounding the central longitudinal axis, a transverse inlet passageway for receiving molten thermoplastic material, an annular cavity located between the inlet passageway and the die opening and connected to the inlet passageway, an annular distribution passage located between the annular cavity and die opening and connected to the annular cavity, and an annular connecting passage extending from the annular distribution passage to the die opening. The annular cavity and annular distribution passage each extend radially with respect to the longitudinal axis.

More specifically, the radial length of the annular cavity gradually diminishes along each side of the circumference from the inlet passageway to the opposite side of the longitudinal axis. The radial length of the distribution passage also gradually diminishes along each side of the circumference from a point closest to the inlet passageway to a point farthest from the inlet passageway. This is accomplished by making the outer dimension of the cavity so that it substantially defines an outer circle, the center of which is located between the longitudinal axis and the inlet passageway, and by making the outer dimension of the distribution passage so that it defines an inner circle, the center of which is located between the center of the outer circle and the longitudinal axis.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
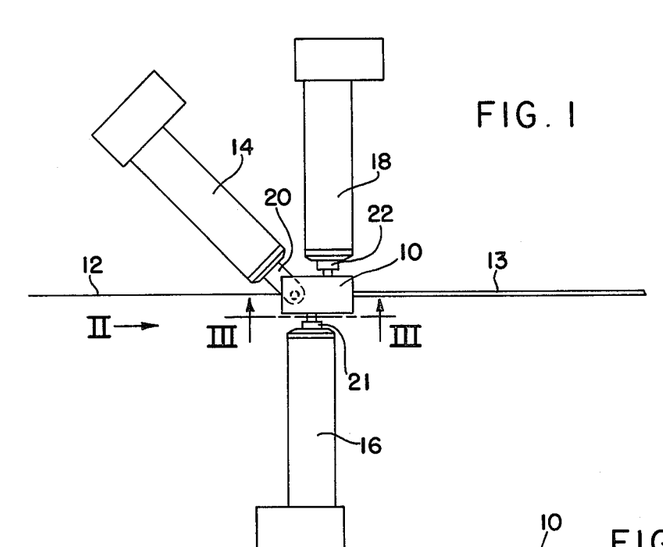
FIG. 1 is a diagrammatic plan view of a crosshead provided with three extrusion dies for producing three thermoplastic layers.
Figure 2:
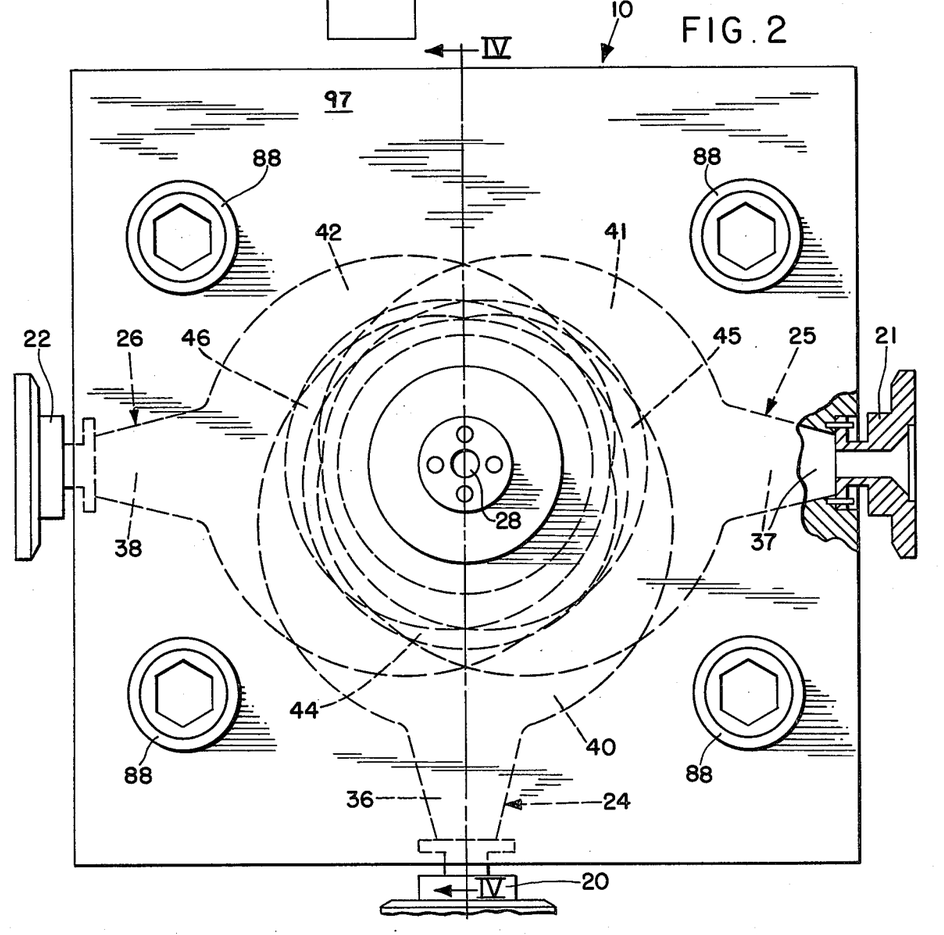
FIG. 2 is a rear elevational view of the crosshead looking in the direction of arrow II of FIG. 1.
Figure 3:
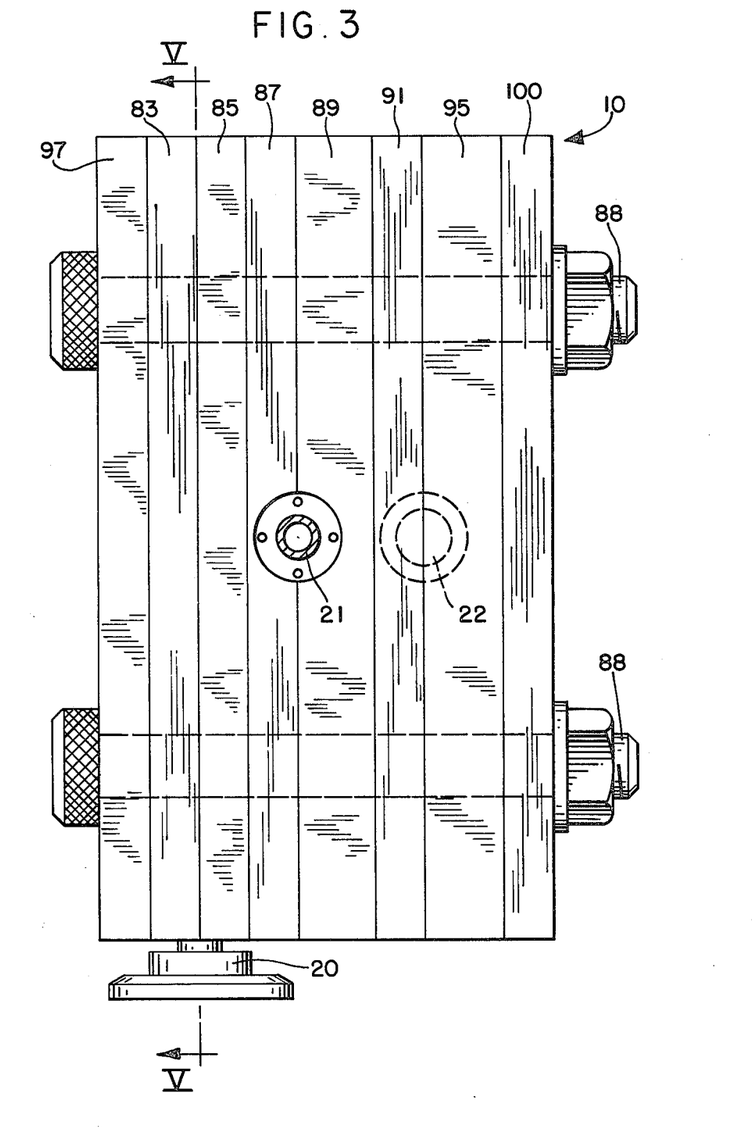
FIG. 3 is a vertical cross-sectional view taken on the line III—III of FIG. 1.

Referring to FIGS. 1, 2, and 3, there is shown an embodiment of the present invention in which a crosshead 10 having three dies are employed to extrude three annular layers of insulating thermoplastic material about a wire. As shown in FIG. 1, the uninsulated wire 12 passes through the crosshead 10 from the left and exits from the crosshead from the right as a coated or insulated wire indicated at 13. Molten thermoplastic material is supplied to the crosshead 10 by three extruders 14, 16, and 18. Each of the extruders receive solid thermoplastic material in pellet or powder form, and the material is melted and mixed along the length of the extruder and introduced to the crosshead in a uniform molting state. Extruders 14, 16, and 18 are connected to the crosshead by means of adapters 20, 21 and 22, respectively, see FIG. 2. The molten thermoplastic material from extruders 14, 16 and 18 flow through adapters 20, 21 and 22, respectively, to three crosshead dies 24, 25 and 26, respectively, generally indicated in FIG. 2. The crosshead 10 also contains a bore 28 through which the wire 12 passes.

Figure 4:
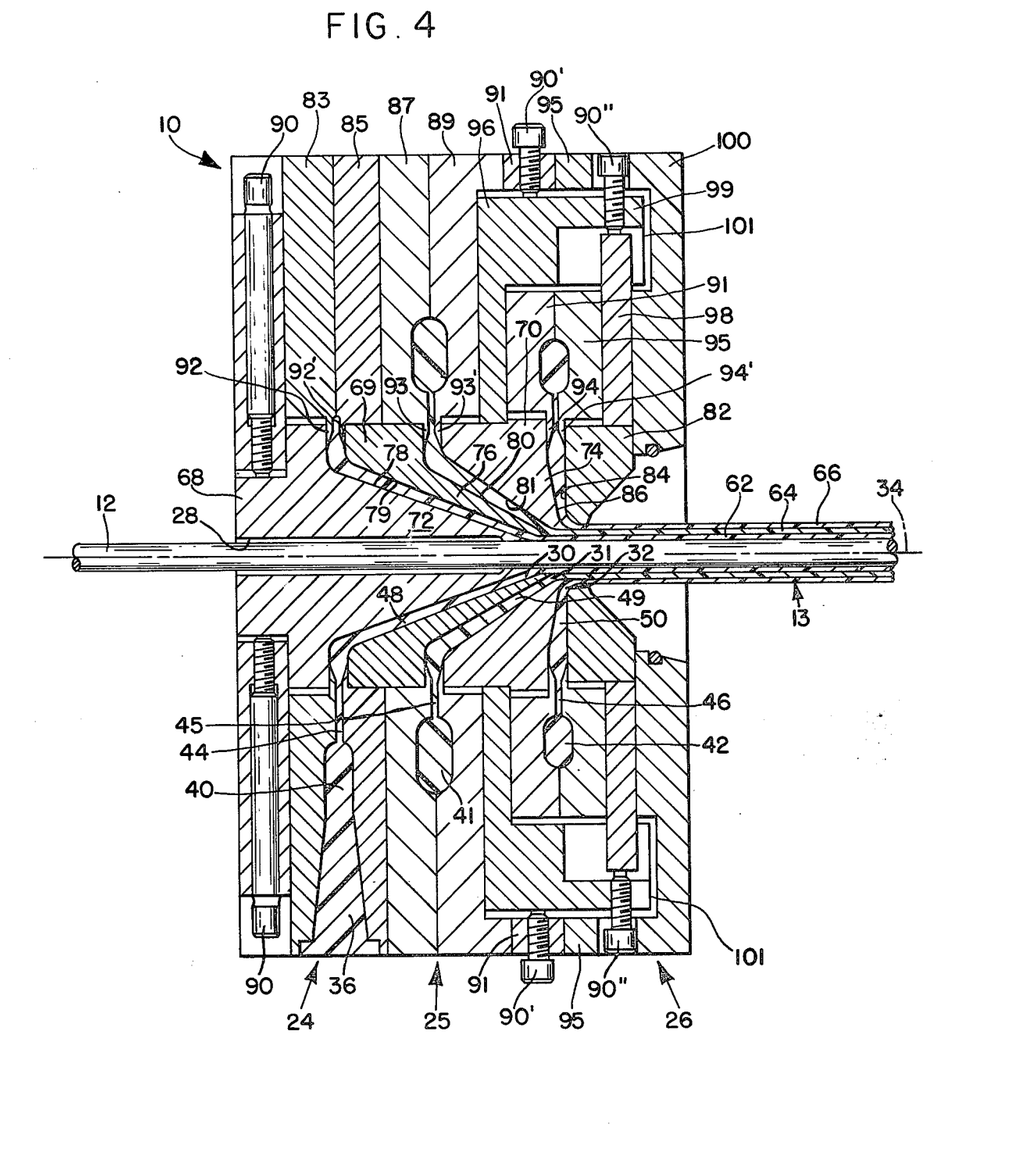
FIG. 4 is a vertical cross-sectional view taken on the line IV—IV of FIG. 2.

Referring to FIG. 4, dies 24, 25 and 26 comprise annular slotted die openings 30, 31 and 32 which surround the central longitudinal axis 34 of the bore and are located at successive points along axis 34. Die opening 30 is located at the farthest upstream position, die opening 32 is located at the farthest downstream position and die opening 31 is located at the intermediate die openings 30 and 32 along the central longitudinal axis 34. Dies 24, 25 and 26 also contain inlet passageways 36, 37 and 38, respectively, see FIG. 2, for receiving molten thermoplastic material from extruders 14, 16 and 18, respectively. Inlet passageways 36, 37 and 38 are spaced 90° apart about axis 34, as shown in FIG. 2. Each die also includes a generally annular cavity located between axis 34 and a respective inlet passageway and connected to the passageway. Each die also comprises a generally annular distribution passage located between the axis 34 and the respective annular cavity and connected to the annular cavity. Dies 24, 25 and 26 comprises annular cavities 40, 41 and 42, respectively, and distribution passages 44, 45 and 46, respectively. Each annular cavity and annular distribution passage surrounds axis 34 and extends radially of the axis so that they lie in planes which are generally perpendicular to the axis. The annular connecting passages 48, 49 and 50 connect distribution passages 44, 45 and 46, respectively, to slotted die openings 30, 31 and 32, respectively. As shown in FIG. 4, the depth of each distribution passage is substantially less than that of its corresponding cavity. However, as shown in FIGS. 6–10, the depth of each cavity diminishes gradually from its inlet passageway to a point on the opposite side of the inlet passageway so that the cavity and distribution passage have the same depth at said opposite point.

Figure 5:
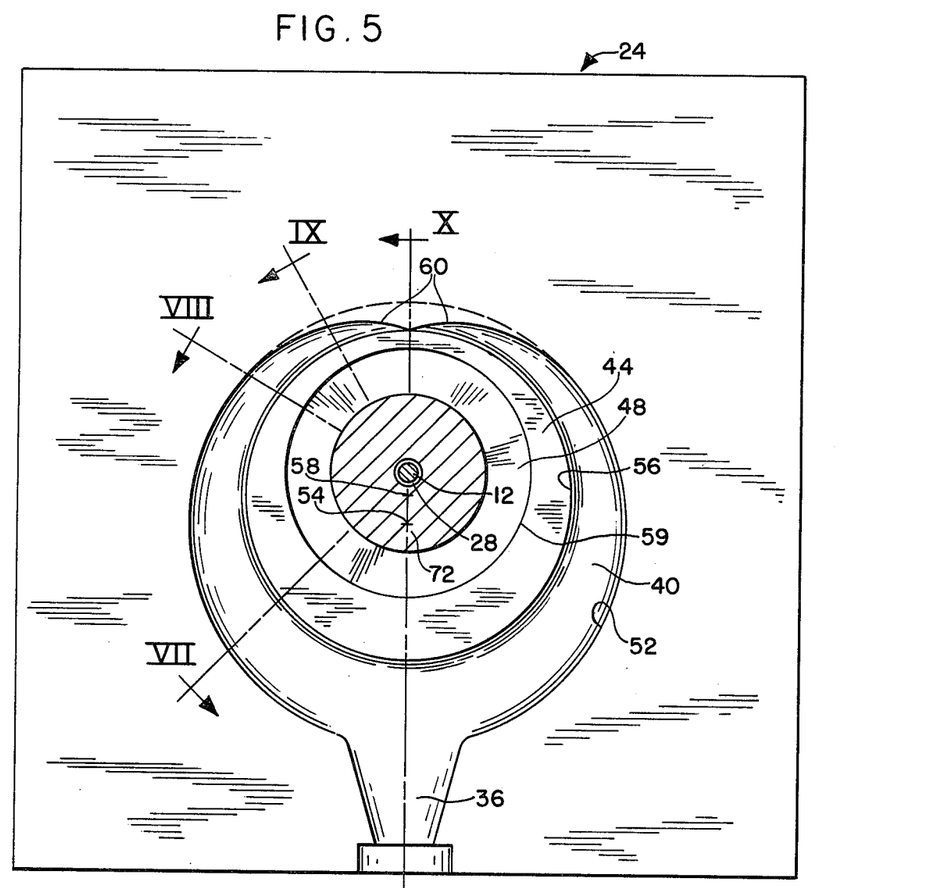
FIG. 5 is a vertical cross-sectional view taken on the line V—V of FIG. 3.
Figure 6:
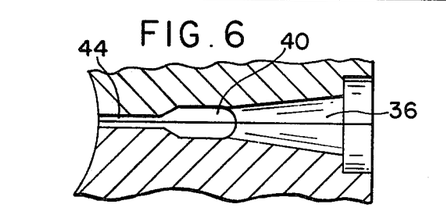
FIG. 6 is a diagrammatic sectional view taken on the line VI—VI of FIG. 5.
Figure 7:
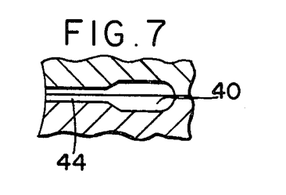
FIG. 7 is a diagrammatic sectional view taken on the line VII—VII of FIG. 5.
Figure 8:
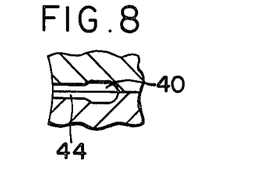
FIG. 8 is a diagrammatic sectional view taken on the line VIII—VIII of FIG. 5.
Figure 9:
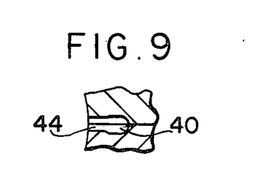
FIG. 9 is a diagrammatic sectional view taken on the line IX—IX of FIG. 5.
Figure 10:
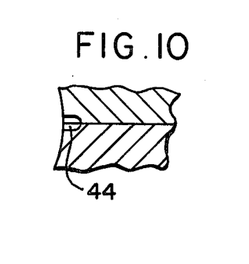
FIG. 10 is a diagrammatic sectional view taken on the line X—X of FIG. 5.

Referring to FIG. 5, there is shown a schematic representation of the cross-sectional shape of die 24. The cross-section is taken along a line coincidental with the central longitudinal axis of cavity 40 and distribution passage 44 and transverse to the central longitudinal axis 34. The cross-sectional configurations of dies 25 and 26 are identical to that of die 24 as shown by the superimposed dotted lines in FIG. 2. However, since the annular distribution passage and cavity of each die is similar, only one die will be described in detail with respect to the shape of its annular cavity and distribution passage.

As shown in FIG. 5, the annular cavity 40 of die 24 has an outer wall 52 which defines an outer circle, the center of which is indicated at 54. Center 54 is located between axis 34 and inlet passageway 36 on a line which intersects axis 34 and passageway 36. The outer dimension of distribution passage 44, indicated by reference numeral 56, defines a circle, the center of which is indicated by reference numeral 58. Center 58 is located between axis 34 and center 54 on a line extending between these two points. The outer dimension 56 of the distribution passage 44 also forms the inner dimension of annular cavity 40. The inner dimension of distribution passage 44, indicated at 59, defines a cavity whose center is axis 34.

Because of the spacing of centers 58 and 54 from axis 34 toward the inlet passageway 36, cavity 40 and distribution passage 44 are substantially longer adjacent the inlet passageway 36 and diminish in length uniformly from both sides of the inlet passageway along their circumference to a point farthest from the inlet passageway or 180° from the inlet passageway. In this way, the shortest flow path for the molten thermoplastic material from the outer wall 52 is located at the point farthest from the inlet passageways 36 and the longest flow path is located adjacent the inlet passageway. The diminishing length of the cavity and distribution passage are illustrated diagrammatically in FIGS. 6–10, these figures being taken along spaced lines extending through one circumferential half of the die shown in FIG. 5. Although the outer dimension of cavity 40 defined by outer surface 52 is substantially circular, a portion of surface 52 at the side opposite inlet passageway 36 deviates inwardly from a circle toward the axis 34. This portion of the surface 52 forms a deviant arc section 60 extending approximately 30° from each side of a point 180° from the supply channel 36. The dimensions of the cavity and distribution passage and their locations relative to axis 34 create an even flow of thermoplastic material into connecting passage 48 throughout its circumference. This produces a uniform flow of material along the circumference of the die opening to produce an annular layer which has a uniform wall thickness throughout its length.

One particular adaptation of the crosshead of the present invention as illustrated in the drawings, is for forming a multi-layer insulation about an electrical wire. As shown in FIG. 4, the wire 12 enters bore 28 and passes within the annulus of each of the annular die openings 30, 31 and along its central longitudinal axis which is coincident with axis 34. As the wire 12 passes by the die openings, die 24 extrudes a first layer of thermoplastic material directly onto the surface of the wire. This first layer is commonly referred to as a "strand shield". Die 25 extrudes a second layer of thermoplastic material about the first layer 62. This second layer is indicated by the reference numeral 64 and is commonly referred to as the "insulation layer". Die 26 extrudes a third layer of thermoplastic material about the second layer 64. This third layer is indicated by the reference numeral 66 and is commonly referred to as the "insulation shield".

When a plurality of dies are employed in the crosshead of the present invention to produce a plurality of thermoplastic layers, the portion of the dies which form the connection passages are constructed of cooperating die parts, commonly referred to in the trade as "tooling". In the embodiment shown in FIG. 4 in which three dies are employed, the first two dies 24 and 25, comprise three frusto-conical tools 68, 69 and 70. Tool 68 is located at the upstream portion of the crosshead and includes a frusto-conical portion 72 concentric with axis 34. Tool 70 is located on the downstream side of the crosshead and has a frusto-conical portion 74 concentric with axis 34. Tool 69 is located between tools 68 and 70 is spaced relationship therewith and has a frusto-conical portion 76 concentric with axis 34. The outer surface 78 of frusto-conical portion 72 cooperates with the inner surface 79 of frusto-conical portion 76 to form the connecting passage 48 of die 24. The outer surface 80 of frusto-conical portion 76 cooperates with the inner portion 81 of frusto-conical portion 74 to form the connecting passage 49 of die 25. Tool 69 is mounted in a stationary position within the crosshead and tools 68 and 70 are adjustably mounted within the crosshead and constitute first and second adjustable tools, respectively. The adjustable tools 68 and 69 have a certain degree of play radially of the axis 34, allowing the removable tools to be adjusted for concentrically with respect to the axis 34 by means of 3 or 4 adjusting screws 90, 90' and 90" which are evenly spaced about the periphery of the tools. In addition, tools 68, 69 and 70 are replaceable so that the crosshead may be easily adapted for insulating wires of different diameters and for applying layers of insulating material having different thicknesses.

As shown in FIGS. 3 and 4, crosshead 10 is constructed of a plurality of flat ring-like plates sandwiched together and held as a unit by locking bolts 88. Plates 83 and 85 form a portion of die 24. Plate 83 and 85 each form one half of the inlet passageway 36, cavity 40 and distribution passage 44 of die 24. Plates 87 and 89 form the inlet passageway 37, cavity 41 and distribution passage 45 of die 25. Plates 91 and 95 form the inlet passageway 38, cavity 42 and distribution passage 46 of die 26. Plates 84, 87, 89, 91, and 95 are sandwiched between end plates 97 and 100. Locking bolts 88 extend through the entire assembly of plates and holds them as a unit as shown in FIG. 3.

This construction enables the crosshead to be disassembled for exchanging the tools. In the event that it is desired to coat a wire having a different diameter or to extrude layers of thermoplastic material having different thicknesses, one or all of the tools 68, 69 and 70 are removed and replaced by similar tools in which the inner and outer surfaces of the frusto-conical portions are commensurate with the desired wire and layer size requirements. In the embodiment shown in FIG. 4, wherein a third layer is extruded, a fourth tool 82 is employed. Tool 82 is also replaceable and adjustably mounted. Tool 82 includes an inner surface 84 which cooperates with the outer surface 86 of the frusto-conical portion 74 to form the connecting passage 50 of die 26.

Each plate 83, 85, 87, 89, 91 and 95 has a resilient annular lip which extends from the distribution passage into the connecting passage formed by the associated tools. The lips of plates 83 and 85 are identified by the reference numerals 92 and 92', respectively, and are biased away from each other so that they form a tight seal in the connecting passage 48. The lips of plates 87 and 89 are identified by the reference numerals 93 and 93', respectively, and the lips of plates 91 and 95 are identified by the reference numerals 94 and 94'. Lip pairs 93, 93' and 94, 94' are also biased in the same manner as lip pair 92, 92' so that they form tight seals in connecting passages 49 and 50, respectively.

When the several sections of the crosshead are assembled in sandwich-like fashion, as shown in FIG. 4, tools 68, 69, 70 and 82 are held tightly in their proper positions along axis 34 by the lips and end plates 97 and 100. Tool 68 is clamped between end plate 97 and lip 92. Tool 69 is clamped between lip 92' and lip 93. Tool 70 is clamped between lip 93' and lip 94. Tool 82 is clamped between lip 94' and end plate 100.

Since the die part 69 is stationary, circumferential uniformity of the first layer 62 is accomplished by adjusting tool 68 radially of axis 34. Adjusting screws 90 are threaded into plate 97. The ends of screws 90 extend through plate 97 and bear against the outer surface of tool 68.

Adjustment for circumferential uniformity of the second layer 64 is made by moving tool 70 radially of axis 34 relative to stationary tool 69 by means of adjusting screws 90' acting through an adjusting member 86. Adjusting member 96 is located within an annular cavity 101 formed in plates 89, 91, 95 and 100. The ends of screws 90' extend through plate 91 and bear against the outer surface of adjusting member 96. Adjusting member 96 fits snugly about the outer surface of tool 70.

Circumferential uniformity of the third or top layer 66 extruded through die opening 32 is established by moving tool 82 radially of axis 34 relative to tool 70. This is accomplished by means of adjusting screws 90" acting through a ring-shaped adjusting member 98 which fits snugly about the outer surface of tool 82. Member 98 is sandwiched between plates 95 and 100 and extends into cavity 101. Adjusting member 96 has a sleeve 99 which surrounds adjusting member 98. Adjusting screws 90" extend freely through apertures 95' in plate 95 and are threaded into sleeve 99. The ends of screws 90" extend through sleeve 99 and bear against the outer surface of adjusting member 98. In this way, adjusting member 98 and tool 82 move with adjusting member 96. Therefore, adjustment of tool 74 does not change the relationship between tool 74 and tool 82 and, consequently, has no effect on the uniformity of the third or top layer 66 extruded through die opening 32. On the other hand, tool 82 may be adjusted radially of axis 34 relative to tool 74 by adjusting member 98 and adjusting screws 90". Consequently, adjustment for circumferential uniformity of the third layer 66 does not have any effect on the circumferential uniformity of the second or center layer 64.

The crosshead of the present invention may also be used for extruding plastic tubing having one or more layers. When the crosshead is used for this purpose, the layers of thermoplastic material are extruded through the die openings onto the outer surface of a hollow mandrel extending along the central longitudinal axis of the crosshead. The mandrel terminates in an open end at a point forward of the last die opening. Gas or pressurized air is blown through the open end of the mandrel to maintain the tubular shape of the one or more layers of thermoplastic material as it passes over the end of the mandrel.

It is obvious that minor changes may be made in the form and construction of the invention without departing from the material spirit thereof. It is not, however, desired to confine the invention to the exact form herein shown and described, but it is desired to include all such as properly come within the scope claimed.

We claim:

1. A crosshead including a die for extruding an annular layer of thermoplastic material about a central longitudinal axis comprising:
   (a) an annular slotted die opening surrounding said longitudinal axis;
   (b) an inlet passageway spaced from said longitudinal axis and located at one side of said crosshead for receiving molten thermoplastic material, said inlet passageway having a flow axis which is generally transverse to said longitudinal axis;
   (c) an annular cavity located between said axis and the inlet passageway, and connected to the inlet passageway, said cavity surrounding said longitudinal axis and extending radially of said longitudinal axis, the cross-sectional area of said cavity gradually diminishing along each half of its circumference from the inlet passageway to a point on its circumference opposite the inlet passageway;
   (d) an annular distribution passage located between said longitudinal axis and said annular cavity and connected to said annular cavity, said distribution passage surrounding said longitudinal axis and extending radially of said annular distribution axis, the depth of said longitudinal passage being substantially less than the depth of the annular cavity and the cross-sectional area of said distribution passage gradually diminishing along each half of its circumference from the inlet passageway to a point on its circumference opposite the inlet passageway; and
   (e) an annular connecting passage surrounding said longitudinal axis and extending from the distribution passage to the die opening.

2. A crosshead as set forth in claim 1, wherein the radial length of said annular cavity gradually diminishes along each half of its circumference from the inlet channel to the opposite side of said longitudinal axis.

3. A crosshead as set forth in claim 2, wherein the depth of said annular cavity gradually diminishes along each half of its circumference from the inlet passageway to the opposite side of said longitudinal axis.

4. A crosshead as set forth in claim 1, wherein the radial length of said distribution passage gradually diminishes along each half of its circumference from a point closest to the inlet passageway to a point furthest from the inlet passageway.

5. A crosshead as set forth in claim 1, wherein the outer dimension of said cavity substantially defines an outer circle, the center of said outer circle being located between said longitudinal axis and the inlet passageway, and the outer dimension of said distribution passage defines an inner circle, the center of said inner circle being located between the center of said outer circle and said longitudinal axis.

6. A crosshead as set forth in claim 1, wherein the outer dimension of the annular distribution passage is circular and the outer dimension of the annular cavity is substantially circular.

7. A crosshead as set forth in claim 6, wherein the outer dimension of the annular cavity is circular except for a deviant arc section extending approximately 30° from each side of a point 180° from the supply channel, each deviant arc section deviating from the circle toward the center so that both arcs converge and intersect with the outer dimension of the annular flow gap at said 180° point.

8. A crosshead as set forth in claim 1, wherein the depth of the connecting passage is greater than the depth of the distribution passage at the point where the connecting passage and distribution passage intersect and the depth of said connecting passage gradually diminishes toward said die opening.

9. A crosshead as set forth in claim 1, wherein said crosshead has a central bore concentric with said longitudinal axis for permitting wire to be drawn axially through the bore and allowing thermoplastic material to be extruded onto the outer surface of said wire and thereby form a layer of thermoplastic material on the wire.

10. A crosshead for extruding at least two layers of thermoplastic material about a central longitudinal axis, said crosshead comprising an upstream die for forming the inner layer of thermoplastic material and a downstream die opening for forming the outer layer of thermoplastic material, each of said dies comprising:
- (a) an annular slotted die opening surrounding said longitudinal axis;
- (b) an inlet passageway spaced from and located at one side of said die opening for receiving molten thermoplastic material, said inlet passageway having a flow axis which is generally transverse to said longitudinal axis;
- (c) an annular cavity surrounding said longitudinal axis and connected to the inlet passageway, said cavity extending radially with respect to said longitudinal axis, between said longitudinal axis and the inlet passageway;
- (d) an annular distribution passage located between said longitudinal axis and said annular cavity and connected to the annular cavity, said distribution passage extending radially with respect to said longitudinal axis and the depth of said distribution passage being less than the depth of the annular cavity; and
- (e) an annular connecting passage surrounding said longitudinal axis and extending from the distribution passage to the die opening, the connecting passage of the upstream die converging toward the connecting passage of the downstream die so that said die openings are substantially closer together along said longitudinal axis than their corresponding distribution passages.

11. A crosshead as set forth in claim 10, wherein the portions of said dies which define the annular connecting passages comprise:
- (a) a first adjustable tool concentric with said longitudinal axis;
- (b) a second adjustable tool concentric with said longitudinal axis, said tool being spaced from and located downstream of said first adjustable tool;
- (c) a stationary tool located between the first and second adjustable tools, said fixed tool being spaced from said first adjustable tool to form the connecting passage and die opening of said upstream die and being spaced from said second adjustable tool to form the connecting passage and die opening of said downstream die;
- (d) first adjusting means for adjusting the first adjustable tool transversely of said longitudinal axis and relative to said stationary tool to form a uniform die opening in said upstream die; and
- (e) second adjusting means for adjusting the second adjustable tool transversely of said longitudinal axis and relative to said stationary tool to form a uniform die opening in said downstream die.

12. A crosshead as set forth in claim 11, wherein said adjustable tool has a frusto-conical outer surface, said second adjustable tool has a frusto-conical inner surface, and said tool has a frusto-conical inner surface for cooperating with the conical outer surface of said adjustable tool to form the connecting passage of the upstream die, said tool also having an outer frusto-conical surface for cooperating with the conical inner surface of said second adjustable tool to form the connecting passage of the downstream die, each of said frusto-conical surfaces being co-axial with said longitudinal axis with the narrow end of the cone downstream of the base.

13. A crosshead as set forth in claim 11, wherein said crosshead includes a third die having the same elements as the first two dies, said third die comprising:
- (a) a third adjustable tool concentric with said longitudinal axis, said third adjustable tool being spaced from and located downstream of said second adjustable tool to form the connecting passage and die opening of said third die;
- (b) a projecting element which forms part of said second adjusting means for adjusting said third adjustable tool in unison with said second adjustable tool; and
- (c) third adjusting means for adjusting the third adjusting tool transversely of said longitudinal axis and relative to said second adjustable tool to form a uniform die opening in said third die.

14. A crosshead as set forth in claim 10, wherein said crosshead has a central bore which is concentric with said longitudinal axis and extends through said tools for permitting wire to be drawn axially through the bore and allowing said layers of thermoplastic material to be applied successively to said wire and thereby form a multi-layer coating of thermoplastic material on the wire.

* * * * *